United States Patent

Momose et al.

[11] 4,217,043
[45] Aug. 12, 1980

[54] CAMERA HAVING AN AUTOMATIC FOCUS CONTROL APPARATUS

[75] Inventors: Haruhiko Momose; Masashi Yamada, both of Hachioji; Yaichi Iijima, Sagamihara, all of Japan

[73] Assignee: Konishiroku Photo Industry Co., Ltd., Nihonbaski, Japan

[21] Appl. No.: 940,396

[22] Filed: Sep. 7, 1978

[51] Int. Cl.$^2$ .............................................. G03B 3/00
[52] U.S. Cl. ................................................... 354/25
[58] Field of Search .................... 354/25, 31; 352/140; 355/56; 250/201

[56] References Cited

U.S. PATENT DOCUMENTS 4,075,639  2/1978  Peterson ................................. 354/25

Primary Examiner—Michael L. Gellner

Attorney, Agent, or Firm—Finnegan, Henderson, Farabow, Garrett & Dunner

[57] ABSTRACT

An automatic focus control apparatus for a camera lens which includes a fixed and a movable optical system, each adapted to form an image of an object to be photographed on a respective photosensitive means. The movable optical system includes a rotatable mirror movable successively in opposite directions, in the first direction at a high rate of speed, and in the second direction at a low rate of speed simultaneously with lens adjustment. Signal processing means compares the signals provided by the photosensitive means and stops the lens and operates a camera shutter during movement of the mirror in the second direction when a maximum or minimum output signal compares with a selected maximum or minimum output signal generated during movement of the mirror in the first direction.

3 Claims, 3 Drawing Figures

CAMERA HAVING AN AUTOMATIC FOCUS CONTROL APPARATUS

FIELD OF INVENTION

The present invention relates to the improvements of an automatic focus control apparatus of a camera in which focus control of a camera lens is arranged with accuracy.

BACKGROUND OF INVENTION

There has been known a camera having an automatic focus control apparatus of the type in which a scanning mechanism of a photoelectric distance measuring instrument is made to make one round trip in two directions, and after a circuit is caused to memorize the maximum or minimum value (This is a value selected by the design of the circuit.) in the photoelectric signal detected in a scanning stage in one direction, and when in the scanning stage in the inverse direction a photoelectric signal almost equal to the maximum or minimum value memorized in the former direction is obtained, a camera lens in the moving state for focus regulation is stopped by a detection signal.

In the automatic focus control apparatus of such a camera, the lower the scanning speed of scanning mechanism of a photoelectric distance measuring instrument, the higher the accuracy of focus regulation becomes. Because usually a camera lens is coupled with scanning mechanism, etc. and caused to stop moving of the basis on a detection signal of the maximum value (or minimum value) from the distance measuring instrument, but since there is naturally some time lag before some stopping device (eg. magnet) receives said detection signal and acts to stop the movement of the camera lens, the moving speed of a camera lens interlocking with the scanning mechanism becomes slow, if the scanning speed of it is slow and discrepancy of the position of stop of the camera lens lessens. And when the main illuminating light of the subject is a fluorescent lamp or something, the discharge cycle of the fluorescent lamp overlaps the output of a light receiving element. By this, the position of maximum value (or minimum value) is deviated and an error will occur on the originating time of the detection signal. And when a camera lens is stopped by thrusting a click-like member into a saw tooth-like restraining portion, a camera lens is to be set at the same place, even if the click-like member thrusts into any portion of a valley of one saw tooth, but in the one in which the stop position of a camera lens is determined stagewise, if the moving speed of a camera lens is made slow, the error of the originating time of detection signal due to light of a fluorescent lamp as mentioned above, is sufficiently small; there is obtained the effect that the range within a valley of one saw tooth is obtained, and a camera lens can be stopped at an accurate stage, that is, the position of a camera lens determined by a detection signal. Further, since a camera lens is fairly heavy, a great inertia applies to a source of energy, whatever way it may be operated in (such as spring or motor). Therefore, the operation becomes unstable and further when a camera lens is stopped, there arises a problem of photographing blur due to vibrations, etc. However, if the moving speed of a camera lens is made slow, the above defect can be eliminated.

As mentioned above, in automatic focus control, it can be said that the slower the scanning speed of scanning mechanism of a photoelectric distance measuring instrument and the speed of a camera lens interlocking with the working, the higher the accuracy rises, but since a photographer is to release a shutter watching for a good chance of taking photographs, time required for automatic focus control naturally has its own limit. Empirically, that seems to be about 100 ms. In short, an ordinary photographer holds a camera in the photographing state for about 100 ms. after pressing a shutter release button, but he thinks that photographing is over if more time than that has passed. Of course, if more time than this, is needed in focus regulation, a chance of photographing will be lost and the desired photograph can not be taken. For this reason, there arises a limitation that a scanning speed of scanning mechanism of a photoelectric distance measuring instrument cannot be dropped to a given point of below.

OBJECT OF INVENTION

The present invention provides a camera having an automatic focus control apparatus whereby limitation of the abovementioned time required for automatic focus regulation is not exceeded and yet the higher accuracy is obtained; for this purpose, the present invention has utilized the limited time effectively by making slower the scanning speed in the inverse direction of a photoelectric distance measuring instrument by which a camera lens is moved and stopped than that in another direction.

The present invention will be described with reference to the accompanying drawings.

BRIEF DESCRIPTIONS OF DRAWINGS

DESCRIPTIONS OF PREFERRED EMBODIMENTS

Figure 1:
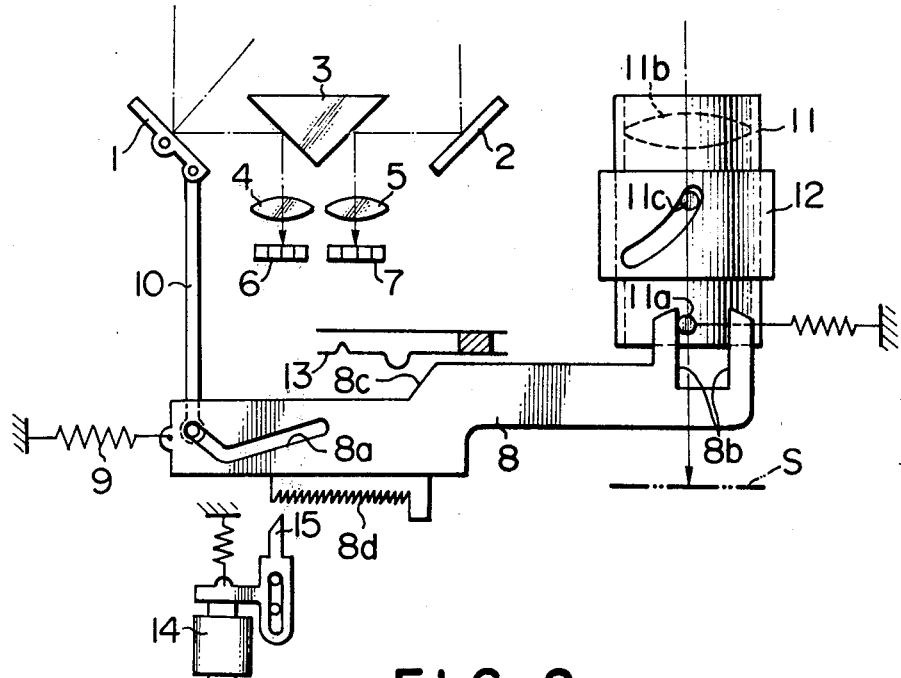
FIG. 1 is a diagram showing one example of a mechanism for two-way scanning of a scanning light path.
Figure 2:
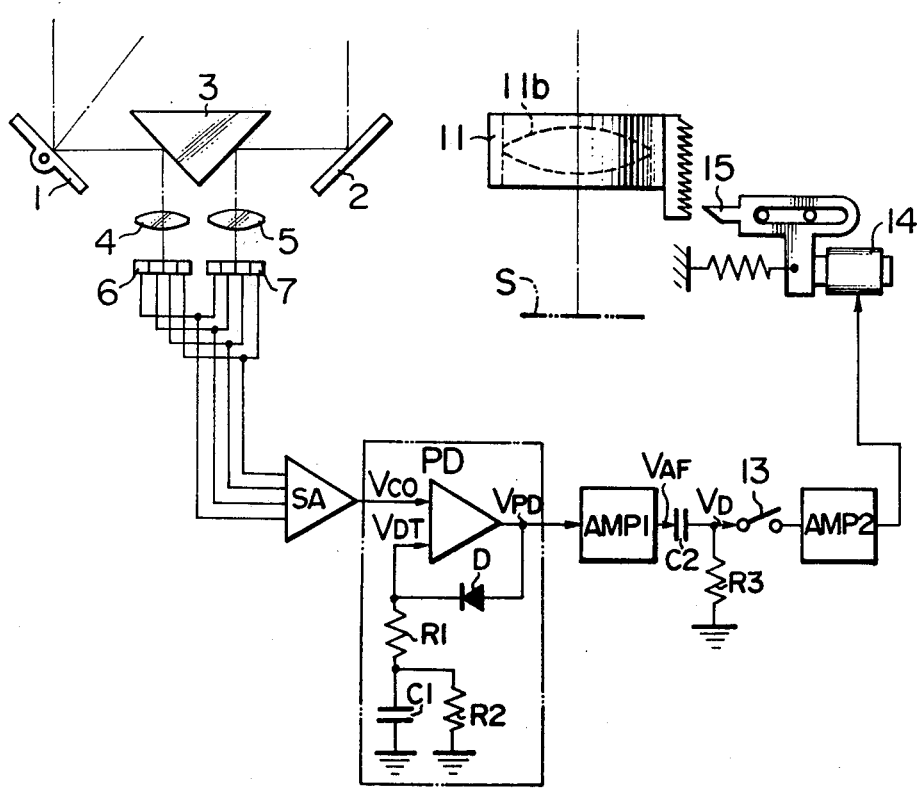
FIG. 2 shows a working circuit for an automatic focus control apparatus.
Figure 3:
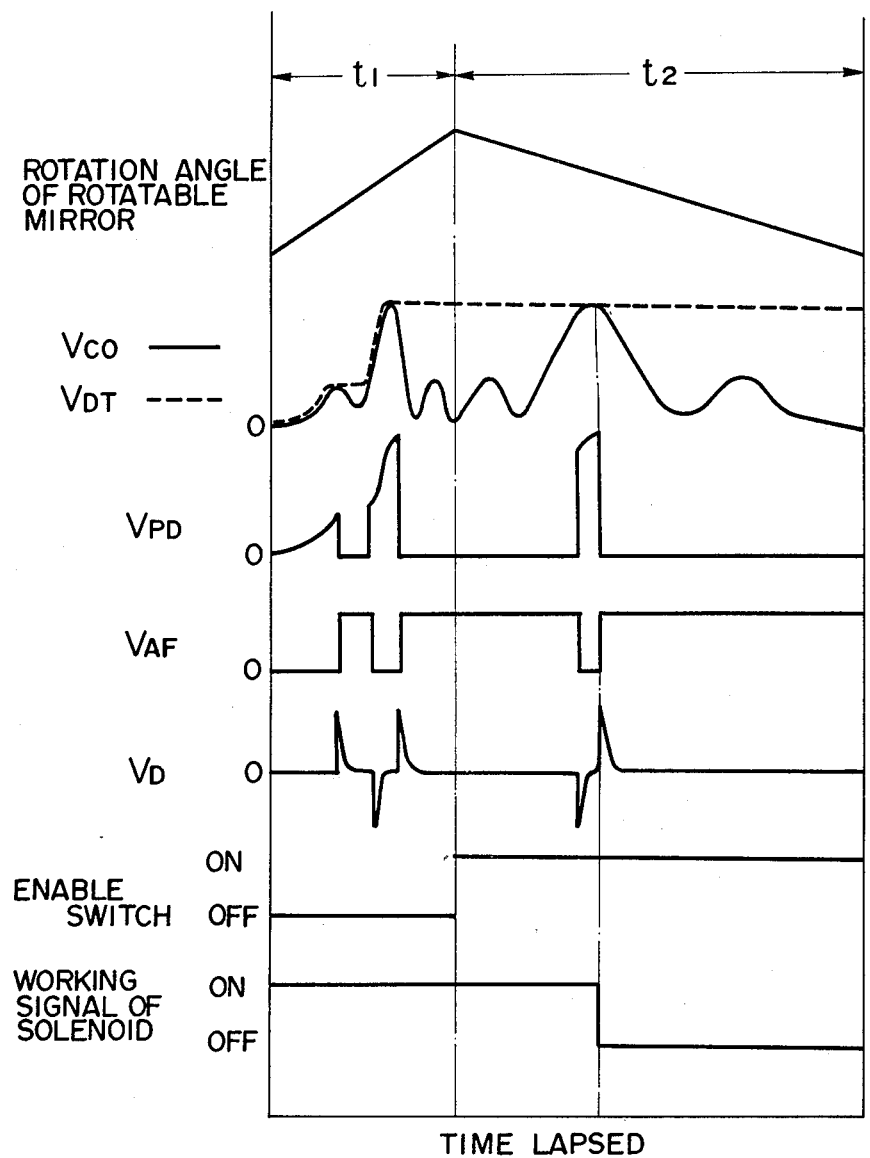
FIG. 3 shows characteristics of a signal for detecting the position of the subject.

In the Figures, 1 is a rotatable mirror, 2 is a fixed mirror, 3 is a mirror prism, 4 and 5 are lenses, and 6 and 7 are light-receiving elements consisting of photodiode array. A light path led to the light-receiving element 6 from the mirror 1 by way of the mirror prism 3 and the lens 4 is a scanning light path, and makes a round scanning in one direction and the inverse direction by means of the left and right reciprocating rotations of the rotatable mirror 1. A light path led to the light-receiving element 7 from the fixed mirror 2 by way of the mirror prism 3 and lens 5 is a fixed light path. The embodiment illustrated in the Figure shows a distance measuring instrument in which a scanning light path and a fixed light path are used, but even if both light paths are scanning light paths, the present invention can be worked and for the scanning mechanism, a prism or lens may be used instead of a mirror. One embodiment of a means of rotating left and right the rotatable mirror 1 is as shown in FIG. 1, and a control member 8 is unlocked by pressing a release button (not shown), goes left, pulled with a spring 9, and rotates the rotatable mirror 1 left and right with a cam 8a by way of a cam link 10. The cam 8a rotates right at a high speed the rotatable mirror 1 in the cam plane of the first steep slope and rotates left at a gentle speed the rotatable mirror 1 in the cam plane of a subsequent back gentle slope. On the other hand, a lens-driving portion 8b is mounted on the control member 8 and a driven pin 11a built in a lens mount 11 is engaged with the lens-driving portion 8b. When the control member 8 goes left, the lens-driving portion 8b does not act to the driven pin 11a so long as the rotatable mirror 1 is being rotated right at a high speed and at a time when the rotatable mirror 1 is given a return rotation, it engages the driven pin 11a and at that time, a camera lens 11b is begun to move in correspondence with the scanning rotation of the rotatable mirror 1. Now, the movement of the camera lens 11b is made by moving the driven pin 11a in the engagement with the lens-driving portion 8b of the control member 8, moving thereby the lens mount 11 and moving slidably a cam pin 11c built in the lens mount in a cam groove of a cam sleeve 12 fixed to the camera body. And on the control member 8, there is mounted a switching cam 8c which closes an enable switch 13 and at a time when the control member 8 gives the rotatable mirror 1 a return rotation, the switching cam 8c closes the enable switch 13 and successively causes it to keep the closing state. Further on the control member 8 there is mounted a restraint portion 8d and when the rotatable mirror 1 enters into return rotation and the output due to light receipt of the light-receiving elements 6 and 7 at the closing state of the enable switch agrees most, that is, when the position of the subject is again arrested while the distance measuring instrument is scanning in the scanning light path in the inverse direction, a solenoid signal of "Stop" enters into solenoid 14 and an engagement click 15 is engaged with the restraint portion 8d to stop the control member 8. Accordingly, the rotatable mirror 1 and the camera lens 11b stop in the state of arresting the subject. Then, a publicly known means (not shown) acts to release a shutter and photographing according to accurate distance measurement is carried out. There is shown in FIG. 2 an example of a working circuit to operate solenoid by arresting the position of the subject while the distance measuring instrument is making scanning in the inverse direction, of the scanning light path. As mentioned above, when the rotatable mirror 1 is making a rapid forward rotation, that is, when the scanning path is scanning in one direction, the enable switch 13 is open and consequently, the outputs of the light-receiving elements 6 and 7 during that time are compared, and given a detection signal for the focus position by way of an sum amplifier SA, a peak detector circuit PD, an amplifier AMP 1 and a differential circuit, but said signal $V_D$ is intercepted with the switch 13 and does not act on the solenoid 14. The light-receiving elements 6 and 7 are, respectively, composed of photodiode array and the optical image of the subject on the light-receiving elements 6 and 7 is operated with sum amplifier SA as a photoelectric comparative signal and is output from the sum amplifier SA as a correlation signal $V_{CO}$ showing a high voltage to the extent that the outputs of the light-receiving elements 6 and 7 agree wholly. The peak detector circuit PD is a circuit taking out a peak detector signal $V_{PD}$ from this correlation signal $V_{CO}$, and gives its own out-put signal to a commutating element D, compares detection voltage $V_{DT}$ which has charged a condenser C1 and the voltage of the correlation signal $V_{CO}$. When the voltage of $V_{CO}$ is higher than $V_{DT}$, it outputs the voltage of $V_{CO}$ and when the voltage of $V_{CO}$ is lower than the voltage of $V_{DT}$, it outputs the voltage of the low level, and thus, it outputs the peak detector signal $V_{PD}$. The amplifier AMP 1 makes the peak detector signal $V_{PD}$ into an automatic focus detecting signal $V_{AF}$ by shaping the wave-form. The differential circuit consisting of a condenser C2 and a resistor R3 converts this automatic focus detecting signal $V_{AF}$ into a pulse signal $V_D$ showing a pulse-like focus position. FIG. 3 shows the states of each signal corresponding to the position scanned with the rotatable mirror 1, and the range of one scanning time $t_1$ is the state in which the rotatable mirror 1 makes a rapid forward rotation, and the range of inverse scanning time $t_2$ is the state in which the rotatable mirror 1 makes a gentle return rotation. In the correlation signal $V_{CO}$, many maximum values appear as shown in the diagram and one-way scanning tends to issue wrong signals of "Stop" of a lens, and hence, this is the reason why a method by two-way, that is, reciprocating scanning is adopted.

Now, when the rotatable mirror 1 enters into a gentle return rotation, the enable switch 13 is closed, the outputs of the light-receiving elements 6 and 7 are compared, the correlation signal $V_{CO}$ output from the sum amplifier SA is compared with the maximum voltage which charged the condenser C1 at the time of the previous forward rotation of the rotatable mirror in the peak detector signal $V_{PD}$ which has the same voltage as the correlation signal only when the voltage of the correlation signal is more than said maximum voltage. The voltage of the correlation signal $V_{CO}$ becomes more than the maximum voltage at the forward rotation of the rotatable mirror only when the distance measuring instrument arrests the position of the subject because attenuation of charge of the condenser C1 is very little; accordingly, the peak detector signal $V_{PD}$ gives the time when the distance measuring instrument arrests the position of the subject accurately. And the peak detector signal $V_{PD}$ is shaped with the amplifier AMP 1, becomes the automatic focus detecting signal $V_{AF}$, further is converted into the pulse signal $V_D$, passes through the enable switch 13 and is input to an amplifier AMP 2. The amplifier AMP 2 converts the pulse signal $V_D$ into a step signal in which only pulse rise in the forward direction is utilized, inputs into the solenoid 14 said step signal as a solenoid "Stop" signal, and stops the lens mount directly, as shown in FIG. 2, or indirectly by way of the control member as shown in FIG. 1. Further, S in the Figure is the film surface and $R_1$–$R_3$ in FIG. 2 are resistance.

As mentioned above, in the present invention, since accuracy of a focus detecting signal in which the distant measuring instruments arrests the position of the subject by scanning in the two-way directions of the scanning path is hardly influenced by the time distribution in the two-way directions, that is, by the ration of two-way speeds, the speed of scanning in the inverse direction and the corresponding lens moving speed are delayed and the stop of a lens at the focus position on the basis of a focus detecting signal having a high accuracy has been arranged to be accurately conducted. Hence, according to the present invention, an accurate automatic focus regulation can be conducted without lengthening the total two-way scanning time of a distance measuring instrument, that is, without losing a shutter chance.

In the present invention, scanning of a distance measuring instrument may go to the nearest distance and return to an infinitely long distance and vice versa, and each of light-receiving elements may be of a single composition, instead of plural combined elements or circuit construction in which a pulse signal is found by the minimum value detection and solenoid is worked by the utilization of signal rise may be changed.

Further, the scanning mechanism of a photoelectric distance measuring instrument does not necessarily need to make its optical system a separate body from a camera lens, and the present invention can be readily applied to a single lens reflex camera if the scanning mechanism is made into theat of "through the lens" type and the moving speed of a camera lens is changed.

What is claimed is:

1. An automatic focus control apparatus for focusing an adjustable lens of a camera, said camera having a pair of photosensitve receiving means, means for forming a pair of auxiliary mirror images of an object or scene to be photographed including a pair of auxiliary optical systems, one having a rotatable mirror and the other having a fixed mirror, means for matching said auxiliary images to each other including an automatic control means operable to move said rotatable mirror successively in opposite directions, and signal processing means adapted to compare the signals provided by the pair of photosensitive receiving means to provide a maximum or minimum output signal during movement of the rotatable mirror in the second direction on the basis of the maximum or minimum comparison values determined during movement of the rotatable mirror in the first direction, whereby the movable mirror is stopped as the output signal values are matched, the improvement wherein said automatic control means is operable to move the rotatable mirror in the first direction at a high rate of speed, and in the second direction at a substantially lower rate of speed, and means for releasing a shutter when said movable mirror is stopped.

2. An automatic focus control apparatus as set forth in claim 1, wherein the control means comprises a movable cam having a pair of oppositely extending sloped surfaces of different inclinations, means engaging said cam surfaces and interconnected with said rotatable mirror, whereby movement of said cam in one direction causes said rotatable mirror to move at a high rate of speed in the first direction and at a relatively lower rate of speed in the second direction, and a follower engaging said adjustable lens to move and focus said lens at the start of the movable mirror's movement in the second direction.

3. An automatic focus control apparatus as set forth in claim 2 wherein said means engaging said cam surfaces includes a cam link having one end connected to the rotatable mirror and its other end provided with a pin engaging the cam surfaces.

* * * * *

UNITED STATES PATENT AND TRADEMARK OFFICE
CERTIFICATE OF CORRECTION

PATENT NO. : 4,217,043
DATED : August 12, 1980
INVENTOR(S) : Haruhiko Momose et al.

It is certified that error appears in the above—identified patent and that said Letters Patent is hereby corrected as shown below:

Column 5, line 26, change "values" to --value--.
Column 6, line  2, change "movable mirror" to --adjustable lens--.
Column 6, line  8, change "movable mirror" to --adjustable lens--.

Signed and Sealed this

Twenty-third Day of August 1983

[SEAL]

Attest:

Attesting Officer

GERALD J. MOSSINGHOFF

Commissioner of Patents and Trademarks